United States Patent
Blumenau et al.

(10) Patent No.: US 6,931,440 B1
(45) Date of Patent: Aug. 16, 2005

(54) METHOD AND APPARATUS FOR DYNAMICALLY DETERMINING WHETHER ACCESS TO A RESOURCE CONNECTED TO A COMPUTER HAS CHANGED AND DETERMINING HOW TO ACCESS THE RESOURCE WITH A NEW IDENTIFIER

(75) Inventors: Steven M Blumenau, Holliston, MA (US); Steven Cohen, Westboro, MA (US)

(73) Assignee: EMC Corporation, Hopkinton, MA (US)

(*) Notice: Subject to any disclaimer, the term of this patent is extended or adjusted under 35 U.S.C. 154(b) by 0 days.

(21) Appl. No.: 09/295,718

(22) Filed: Apr. 21, 1999

(51) Int. Cl.$^7$ ................................. G06F 15/16
(52) U.S. Cl. ................ 709/220; 709/221; 709/225; 709/227; 709/229
(58) Field of Search .................... 709/220, 221, 709/225, 227, 229, 201, 203, 237, 318; 710/104; 712/15; 717/168, 170

(56) References Cited

U.S. PATENT DOCUMENTS

| | | | |
|---|---|---|---|
| 5,339,430 A | * | 8/1994 | Lundin et al. |
| 5,546,584 A | * | 8/1996 | Lundin et al. |
| 5,555,418 A | * | 9/1996 | Nilsson et al. |
| 5,574,851 A | * | 11/1996 | Rathunde |
| 5,802,364 A | * | 9/1998 | Senator et al. |
| 5,895,493 A | * | 4/1999 | Gatica |
| 5,920,725 A | * | 7/1999 | Ma et al. ............... 707/203 |
| 5,923,850 A | * | 7/1999 | Barroux |
| 6,009,524 A | * | 12/1999 | Olarig et al. |
| 6,012,088 A | * | 1/2000 | Li et al. ............... 709/220 |
| 6,026,157 A | * | 2/2000 | Gulik et al. |
| 6,058,489 A | * | 5/2000 | Schultz et al. |
| 6,076,142 A | * | 6/2000 | Corrington et al. |
| 6,101,327 A | * | 8/2000 | Holte-Rost et al. |
| 6,119,131 A | | 9/2000 | Cabrera et al. |
| 6,134,663 A | * | 10/2000 | Nakamura et al. |
| 6,167,408 A | * | 12/2000 | Cannon et al. |
| 6,175,919 B1 | * | 1/2001 | Ha ............... 713/100 |
| 6,178,520 B1 | * | 1/2001 | DeKoning et al. |
| 6,195,792 B1 | * | 2/2001 | Turnbull et al. |
| 6,202,070 B1 | * | 3/2001 | Nguyen et al. |
| 6,202,207 B1 | * | 3/2001 | Honohue ............... 709/221 |

(Continued)

*Primary Examiner*—Rupal Dharia
*Assistant Examiner*—Stephan Willett
(74) *Attorney, Agent, or Firm*—Wolf, Greenfield & Sacks, P.C.

(57) ABSTRACT

One embodiment is directed to a method and apparatus for modifying a configuration of a computer system including a host computer and at least one computer system resource accessible to at least one application program executing on the host computer. The computer system is dynamically reconfigured, without reinitializing the host computer or the application program, to alter a manner in which the at least one application program accesses the at least one computer system resource. Another embodiment is directed to a method and apparatus for responding to changes in a configuration of the computer system impacting a manner in which the at least one computer system resource is accessed by the host computer. Information relating to a first configuration of the computer system at a first point in time is stored, the first configuration relating to a first manner of accessing the at least one computer system resource by the host computer. A second configuration of the computer system at a second point in time is determined, the second configuration relating to a second manner of accessing the at least one computer system resource by the host computer. The second configuration of the computer system is compared with the first configuration to determine whether the second configuration differs from the first configuration. When it is determined that the second configuration differs from the first configuration, the second manner of accessing the at least one computer system resource by the host computer is determined.

34 Claims, 9 Drawing Sheets

U.S. PATENT DOCUMENTS

| | | | |
|---|---|---|---|
| 6,216,202 B1 * | 4/2001 | D'Errico | |
| 6,260,120 B1 * | 7/2001 | Blumenau et al. | |
| 6,289,511 B1 * | 9/2001 | Hubinette | |
| 6,308,205 B1 * | 10/2001 | Carcerano et al. | 709/221 |
| 6,324,693 B1 * | 11/2001 | Brodersen et al. | 709/203 |
| 6,334,178 B1 * | 12/2001 | Cannon et al. | |
| 6,345,294 B1 * | 2/2002 | O'Toole et al. | 709/203 |
| 6,353,928 B1 * | 3/2002 | Altberg et al. | 709/318 |
| 6,397,385 B1 * | 5/2002 | Kravitz | 717/170 |
| 6,408,434 B1 * | 6/2002 | Fujiwara | 717/170 |
| 6,418,555 B2 * | 7/2002 | Mohammed | |
| 6,449,365 B1 * | 9/2002 | Hodges et al. | |
| 6,473,899 B1 * | 10/2002 | Nelson et al. | 709/221 |
| 6,505,268 B1 * | 1/2003 | Schultz et al. | |
| 6,510,491 B1 * | 1/2003 | Franklin et al. | |
| 6,553,387 B1 * | 4/2003 | Cabrera et al. | |
| 2001/0014968 A1 * | 8/2001 | Mohammed | |
| 2001/0049732 A1 * | 12/2001 | Raciborski et al. | 709/203 |
| 2001/0053131 A1 * | 12/2001 | Geens | |
| 2002/0021675 A1 * | 2/2002 | Feldman | |

* cited by examiner

| Logical Volume ID | Storage System ID | Storage System ID | Operating System Device ID |
|---|---|---|---|
| /dev/pp1 | d3 | s1 | /dev/dsk/c0t0d0 |
| /dev/pp2 | d1 | s1 | /dev/dsk/c0t0d1 |
| /dev/pp3 | d2 | s1 | /dev/dsk/c0t0d2 |
| /dev/pp4 | d10 | s1 | /dev/dsk/c0t0d3 |
| /dev/pp5 | d6 | s1 | /dev/dsk/c1t0d0 |
| /dev/pp6 | d5 | s1 | /dev/dsk/c1t0d1 |
| /dev/pp7 | d9 | s1 | /dev/dsk/c1t0d2 |
| /dev/pp8 | d8 | s1 | /dev/dsk/c2t0d0 |
| /dev/pp9 | d7 | s1 | /dev/dsk/c2t0d1 |
| /dev/pp10 | d4 | s1 | /dev/dsk/c3t0d0 |
| /dev/pp11 | d11 | s1 | /dev/dsk/c3t0d1 |
| /dev/pp12 | d12 | s1 | /dev/dsk/c3t0d2 |
| /dev/pp13 | d13 | s1 | /dev/dsk/c3t0d3 |

FIG. 4

METHOD AND APPARATUS FOR DYNAMICALLY DETERMINING WHETHER ACCESS TO A RESOURCE CONNECTED TO A COMPUTER HAS CHANGED AND DETERMINING HOW TO ACCESS THE RESOURCE WITH A NEW IDENTIFIER

FIELD OF THE INVENTION

The present invention is directed to a method and apparatus for dynamically modifying a computer system configuration without reinitializing the computer system.

DESCRIPTION OF THE RELATED ART

Many computer systems include one or more host computers and one or more system resources that are accessible thereby. An example of such a computer system is shown in FIG. 1, and includes a host computer 1 and a storage system 3 that serves as a system resource accessible by the host computer 1. The storage system 3 includes a plurality of storage devices on which data are stored. In the exemplary system shown in FIG. 1, the storage system 3 includes a plurality of disk drives 5a and 5b and a plurality of disk controllers 7a–7b that respectively control access to the disk drives 5a and 5b. The storage system 3 further includes a plurality of storage bus directors 9a–d that control communication with the host computer 1 over communication buses 17a–d. Communication buses 17a–d interface to the storage system 3 through ports 18a–d. Finally, the storage system 3 includes an internal bus 13 over which the storage bus directors 9a–d and the disk controllers 7a–7b communicate.

The host computer 1 includes a processor 16 and one or more host bus adapters 15a–d that each controls communication between the processor 16 and the storage system 3 via a corresponding one of the communication buses 17a–d. It should be appreciated that rather than a single processor 16, the host computer 1 can include multiple processors. Each of the buses 17a–d can be any of a number of different types of communication links, with each of the host bus adapters 15a–d and the storage bus directors 9a–d being adapted to communicate using an appropriate protocol for the communication bus coupled between them. For example, each of the communication buses 17a–d can be implemented as a SCSI bus, with the directors 9a–d and adapters 15a–d each being a SCSI driver. Alternatively, communication between the host computer 1 and the storage system 3 can be performed over a Fibre Channel fabric, where the buses 17a–d are Fibre Channel links.

As shown in the exemplary system of FIG. 1, some computer systems employ multiple paths for communicating between the host computer 1 and the storage system 3 (e.g., each path includes one of the host bus adapters 15a–d, one of the buses 17a–d, one of the ports 18a–d, and one of the storage bus directors 9a–d in FIG. 1). In some such systems, each of the host bus adapters 15a–d has the ability to access each of the disk drives 5a–b, through an appropriate storage bus director and disk controller.

FIG. 2 is a schematic representation of a number of mapping layers that may exist in a computer system such as the one shown in FIG. 1. The mapping layers include an application layer 30 which includes application programs executing on the processor 16 of the host computer 1. The application layer 30 will generally refer to data objects used thereby with a label or identifier such as a file name, and will have no knowledge about where the corresponding file is physically stored on the storage system 3 (FIG. 1). In addition, the host computer 1 also includes a file system and/or logical volume manager (LVM) layer 32 that maps each data object specified by the application layer 30 to a particular logical volume (that the host computer 1 perceives to correspond to an actual physical storage device) wherein the data object is stored. The file system/LVM layer 32 will generally refer to a logical volume (also referred to herein as a "raw storage device") using a label or identifier that is at least partially descriptive of a physical component of the computer system that is used by the host computer 1 when accessing the logical volume. The physically descriptive information may include, for example, information descriptive of the one of the multiple paths via which the logical volume may be accessed, as well as a unique identifier for the logical volume. For example, for a SCSI connection, the device identifier "/dev/dsk/c0t0d0" may be used to refer to a raw storage device or logical volume accessible at a channel zero (c0) (which can be any of the multiple paths in FIG. 1), and having a target number zero (to) and a logical unit number (LUN) zero (d0) that together uniquely identify the raw storage device.

Below the file system/LVM layer 32 is a multi-path mapping layer 34 that maps the logical volume address specified by the file system/LVM layer 32, through a particular one of the multiple system paths, to the logical volume address to be presented to the storage system 3. Thus, the multi-path mapping layer 34 not only specifies a particular logical volume address, but also specifies a particular one of the multiple system paths used to access the specified logical volume.

If the storage system 3 were not an intelligent storage system, the logical volume address specified by the multi-pathing layer 34 would identify a particular physical device (e.g., one of the disk drives 5a–b) within the storage system 3. However, in an intelligent storage system such as that shown in FIG. 1, the storage system itself may include a further mapping layer 36, such that the logical volume address passed from the host computer 1 may not correspond directly to an actual physical device (e.g., a disk drive 5a–b) in the storage system 3. Rather, a logical volume specified by the host computer 1 can be spread across multiple physical storage devices (e.g., disk drives 5a–b) or multiple logical volumes accessed by the host computer 1 can be stored on a single physical storage device.

As discussed above, application programs running in the application layer 30 typically access logical volumes within the storage system 3 via the file system/LVM layer 32, which uses identifiers for the logical volumes that are dependent upon a physical configuration of the computer system. This can cause problems when changes are made to the physical configuration of the computer system. User flexibility in reconfiguring a computer system has become more and more prevalent with the advent of Fibre Channel. Fibre Channel is a communication protocol that enables computer system components that were previously incapable of communicating to be coupled together in a manner that enables communication therebetween. An example of a computer system implemented using Fibre Channel is shown in FIG. 3, wherein a host computer 1 is coupled to a storage system 3 (which can be configured as shown in FIG. 1) via a Fibre Channel cloud 100. It should be appreciated that the Fibre Channel cloud 100 can include a number of switching and hub components, such that the host computer 1 and the storage system 3 can communicate with numerous other system components via the cloud 100.

It should be appreciated that when the computer system of FIG. 3 is brought on line, the host computer 1 will be booted or initialized, and will go through a process (referred to as "device discovery") of assigning device identifiers (e.g., "/dev/dsk/c0t0d0" as discussed above), to each raw storage device or logical volume accessible to the host computer through the Fibre Channel cloud 100. It should be appreciated that the assignment of a particular one of the communication paths 102a–d as channel c0 is fairly arbitrary, and is not initially significant, so long as each of the paths 102a–d is assigned a unique channel number. Referring to the illustrative example shown in FIG. 3, during initialization, the communication path 102a initially may be assigned channel designation c0 and communication path 102b initially may be assigned channel designation c1. A first logical volume 104 is made visible to the host computer 1 over a port (not shown) of the storage system 3 that is coupled to path 102a, and a second logical volume 106 is made visible via a port (not shown) coupled to path 102b. Thus, during initialization, the logical volume 104 may be identified by an operating system on the host computer 1 using a device identifier "/dev/dsk/c0t0d0," and the logical volume 106 may be identified using the device identifier "/dev/dsk/c1t0d0".

For example, it should be appreciated that events can occur that may change the physical configuration of the computer system shown in FIG. 3, which may require a rebooting of the host computer 1. Upon rebooting, changes to the physical configuration of the computer system may be detected through device discovery. For example, one such reconfiguration change may be caused by a failure of the port on the storage system 3 that is coupled to the path 102a. If such a failure were to occur, the storage system 3 can be reconfigured so that the logical volume 104 can be exported from the storage system 3 over the port coupled to the path 102b. Thus, after reconfiguration of the storage system 3, the host computer 1 would generally need to be rebooted to recognize the reconfigured nature of the computer system. In doing so, it should be appreciated that the path 102a will no longer be recognized, such that upon reinitialization, a different channel number may be assigned to each of the paths 102b–d. For example, the path 102b may be the first channel recognized by the host computer 1 when it reboots, causing this channel to now be identified as channel c0. As a result of this reinitialization, the device identifier for logical volume 106 could change to "/dev/dsk/c0t0d0", and the device identifier for logical volume 104 could change to "/dev/dsk/c0t1d0".

As discussed above, the file system/LVM layer 32 executing on the host computer 1 accesses a particular logical volume using the device identifier assigned by the operating system. However, it should be appreciated that as a result of the change to the physical configuration of the computer system, the device identifier for each of the logical volumes 104 and 106 will have changed between the time when the host computer 1 was initially booted, and the time when it is rebooted following the change in the physical configuration of the system. It should be appreciated that this can cause significant problems for applications executing on the host computer 1. For example, consider an application program that is executing on the host computer 1 and that stores a particular data file in logical volume 104. After the reconfiguration of the storage system 3 and the resulting reboot of the host computer 1, the device identifier previously used by the file system/LVM mapping layer 32 to access logical volume 104 (e.g., "/dev/dsk/c0t0d0" in the example discussed above) will now, unknown to the application program, actually map to the logical volume 106. Therefore, when performing reads, the application program will actually read the wrong data, and when performing writes, the application program will be overwriting the wrong data in the storage system 3.

It should be appreciated from the foregoing that the use of device identifiers that include information that is dependent upon a physical configuration of the computer system can lead to problems when the computer system is reconfigured, because the operating system device identifiers for one or more logical volumes can change in a manner that is typically not communicated to the application layer 30 (FIG. 2), the file system/LVM layer 32 or the multi-path layer 34. This can result in the wrong data being accessed for a read or write, or can result in a logical volume becoming inaccessible to an application program which is not capable of accessing the logical volume via its new device identifier.

Conventional computer systems do not provide any technique for automatically detecting a change in the system configuration which can lead to the above-described problems. Thus, a system administrator must manually intervene to note that such a reconfiguration of the system has occurred, and must take appropriate action. In addition, even if a system reconfiguration is manually detected in this manner, conventional systems do not provide any technique for dynamically addressing such system configuration changes. Rather, to prevent the above-described problems from occurring, a system administrator must reboot or reinitialize the impacted components of the system (e.g., host computer 1 in the examples above) to enable them to recognize the changes that have occurred, so that each logical volume is addressed with the appropriate identifier.

SUMMARY

One illustrative embodiment of the invention is directed to a method, in a computer system including a host computer and at least one computer system resource accessible to the host computer, of responding to changes in a configuration of the computer system impacting a manner in which the at least one computer system resource is accessed by the host computer. The method comprises steps of: (A) storing information relating to a first configuration of the computer system at a first point in time, the first configuration relating to a first manner of accessing the at least one computer system resource by the host computer; (B) determining a second configuration of the computer system at a second point in time, the second configuration relating to a second manner of accessing the at least one computer system resource by the host computer; (C) comparing the second configuration of the computer system with the first configuration to determine whether the second configuration differs from the first configuration; and (D) when it is determined in the step (C) that the second configuration differs from the first configuration, determining the second manner of accessing the at least one computer system resource by the host computer.

Another illustrative embodiment of the present invention is directed to a method of reconfiguring a computer system including a host computer and at least one computer system resource accessible to at least one application program executing on the host computer. The method comprises a step of: (A) dynamically reconfiguring the computer system, without reinitializing the host computer or the application program, to alter a manner in which the at least one application program accesses the at least one computer system resource.

A further illustrative embodiment of the present invention is directed to a method of updating mapping information in a computer system including a host computer, a storage system, and a mapping entity that includes at least one mapping layer including the mapping information, the host computer including an application layer owning at least one logical object, the at least one mapping layer mapping the at least one logical object from the application layer to a physical layer relating to physical storage locations on the storage system. The method comprises a step of: (A) in response to a change in a configuration of the computer system, dynamically updating the mapping information in the at least one mapping layer to reflect the change in the configuration of the computer system without reinitializing the mapping entity.

Another illustrative embodiment of the present invention is directed to a method of providing mapping information in a computer system including a host computer, at least one storage system and a mapping entity that includes at least one mapping layer including the mapping information, the host computer including an application layer owning a plurality of logical objects, the at least one storage system including a plurality of logical volumes accessible by the host computer, the at least one mapping layer mapping the plurality of logical objects from the application layer to a physical layer relating to the plurality of logical volumes. The method comprises steps of: (A) providing the mapping layer with a first component of information that uniquely identifies each one of the plurality of logical volumes accessible by the host computer using information dependent upon a configuration of the computer system; and (B) providing the mapping layer with a second component of information that uniquely identifies each one of the plurality of logical volumes accessible by the host computer using a piece of information obtainable from the at least one storage system.

A further illustrative embodiment of the present invention is directed to a computer readable medium encoded with a program for execution on a host computer in a computer system including the host computer and at least one computer system resource accessible to the host computer. The program, when executed on the host computer, performs a method of responding to changes in a configuration of the computer system impacting a manner in which the at least one computer system resource is accessed by the host computer, the method comprising steps of: (A) storing information relating to a first configuration of the computer system at a first point in time, the first configuration relating to a first manner of accessing the at least one computer system resource by the host computer; (B) determining a second configuration of the computer system at a second point in time, the second configuration relating to a second manner of accessing the at least one computer system resource by the host computer; (C) comparing the second configuration of the computer system with the first configuration to determine whether the second configuration differs from the first configuration; and (D) when it is determined in the step (C) that the second configuration differs from the first configuration, determining the second manner of accessing the at least one computer system resource by the host computer.

Another illustrative embodiment of the present invention is directed to a computer readable medium encoded with a reconfiguration program for execution on a host computer in a computer system including the host computer and at least one computer system resource accessible to at least one application program executing on the host computer. The reconfiguration program, when executed on the host computer, performs a method of reconfiguring the computer system, the method comprising a step of: (A) dynamically reconfiguring the computer system, without reinitializing the host computer or the application program, to alter a manner in which the at least one application program accesses the at least one computer system resource.

A further illustrative embodiment of the present invention is directed to a computer readable medium encoded with a program for execution on a host computer in a computer system including the host computer, a storage system, and a mapping entity that includes at least one mapping layer including the mapping information, the host computer including an application layer owning at least one logical object, the at least one mapping layer mapping the at least one logical object from the application layer to a physical layer relating to physical storage locations on the storage system. The program, when executed on the host computer, performs a method of updating mapping information in the computer system, the method comprising a step of: (A) in response to a change in a configuration of the computer system, dynamically updating the mapping information in the at least one mapping layer to reflect the change in the configuration of the computer system without reinitializing the mapping entity.

Another illustrative embodiment of the present invention is directed to a computer readable medium encoded with a program for execution on a host computer in a computer system including the host computer, at least one storage system and a mapping entity that includes at least one mapping layer including the mapping information, the host computer including an application layer owning a plurality of logical objects, the at least one storage system including a plurality of logical volumes accessible by the host computer, the at least one mapping layer mapping the plurality of logical objects from the application layer to a physical layer relating to the plurality of logical volumes. The program, when executed on the host computer, performs a method of providing the mapping information, the method comprising steps of: (A) providing the mapping layer with a first component of information that uniquely identifies each one of the plurality of logical volumes accessible by the host computer using information dependent upon a configuration of the computer system; and (B) providing the mapping layer with a second component of information that uniquely identifies each one of the plurality of logical volumes accessible by the host computer using a piece of information obtainable from the at least one storage system.

A further illustrative embodiment of the present invention is directed to a host computer for use in a computer system including the host computer and at least one computer system resource accessible to the host computer. The host computer comprises storing means for storing information relating to a first configuration of the computer system at a first point in time, the first configuration relating to a first manner of accessing the at least one computer system resource by the host computer; first determining means for determining a second configuration of the computer system at a second point in time, the second configuration relating to a second manner of accessing the at least one computer system resource by the host computer; comparing means for comparing the second configuration of the computer system with the first configuration to determine whether the second configuration differs from the first configuration; and second determining means for determining the second manner of accessing the at least one computer system resource by the host computer when it is determined by the first determining means that the second configuration differs from the first configuration.

A further illustrative embodiment of the present invention is directed to a host computer for use in a computer system including the host computer and at least one computer system resource accessible to at least one application program executing on the host computer. The host computer comprises: at least one controller to dynamically reconfigure the computer system, without reinitializing the host computer or the application program, to alter a manner in which the at least one application program accesses the at least one computer system resource.

Another illustrative embodiment of the present invention is directed to a host computer for use in a computer system including the host computer, a storage system, and a mapping entity that includes at least one mapping layer including the mapping information. The host computer comprises: an application layer owning at least one logical object, the at least one mapping layer mapping the at least one logical object from the application layer to a physical layer relating to physical storage locations on the storage system; and at least one controller configured to dynamically update the mapping information in the at least one mapping layer to reflect the change in the configuration of the computer system without reinitializing the mapping entity in response to a change in a configuration of the computer system.

Another illustrative embodiment of the present invention is directed to a host computer for use in a computer system including the host computer, at least one storage system and a mapping entity that includes at least one mapping layer including the mapping information, the host computer including an application layer owning a plurality of logical objects, the at least one storage system including a plurality of logical volumes accessible by the host computer, the at least one mapping layer mapping the plurality of logical objects from the application layer to a physical layer relating to the plurality of logical volumes. The host computer comprises at least one controller configured to: provide the mapping layer with a first component of information that uniquely identifies each one of the plurality of logical volumes accessible by the host computer using information dependent upon a configuration of the computer system; and provide the mapping layer with a second component of information that uniquely identifies each one of the plurality of logical volumes accessible by the host computer using a piece of information obtainable from the at least one storage system.

BRIEF DESCRIPTION OF THE DRAWINGS

FIG. 4 illustrates a routing table that maintains information identifying logical volumes in a manner independent of the physical configuration of the system in accordance with another embodiment of the present invention;

DETAILED DESCRIPTION

Figure 1:
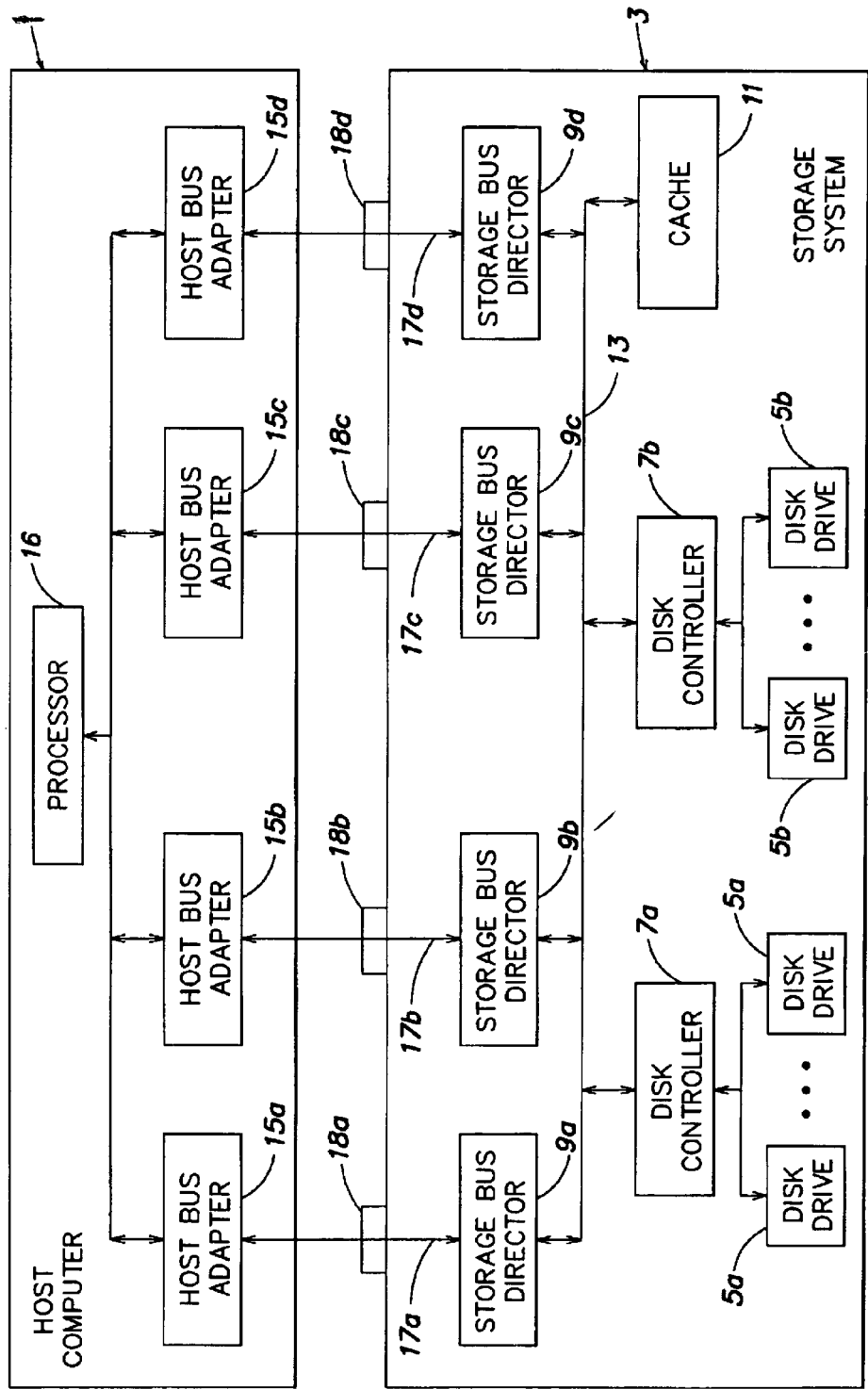
FIG. 1 is a block diagram of an exemplary computer system on which aspects of the present invention can be implemented.
Figure 2:
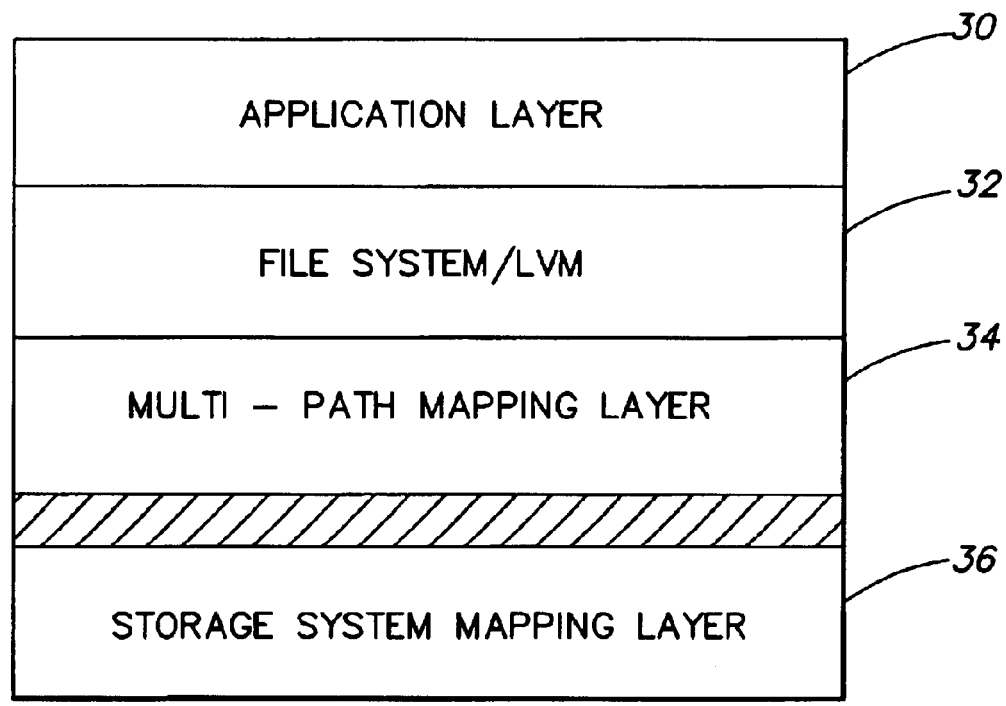
FIG. 2 is a schematic representation of a number of mapping layers that exist in a known computing system.

In accordance with one illustrative embodiment of the present invention, a method and apparatus is provided for dynamically reconfiguring a computer system without requiring rebooting or reinitializing of the computer system. This aspect of the present invention can be used, for example, in connection with a computer system resource (e.g., the host computer 1 of FIG. 1) that accesses other system components (e.g., logical volumes in the storage system of FIG. 1), such that if the computer system is reconfigured so that there is a change in the physical path through which a particular logical volume is accessed by the host computer, the host computer can be dynamically reconfigured to recognize the change without requiring reinitialization of the host computer.

In accordance with another illustrative embodiment of the present invention, a computer system resource (e.g., the host computer 1 of FIG. 1) that accesses other system components (e.g., the storage system of FIG. 1) is provided with information that uniquely identifies each system component accessible to the system resource in a manner that is independent of the physical configuration of the computer system. This information can be correlated or mapped to information that identifies each system component in a manner that is dependent upon the physical configuration of the computer system, so that the system resource can use this information to identify system configuration changes in a manner described below. In addition, the information that identifies system components in a configuration-independent manner can be used in association with the embodiment of the present invention relating to dynamic reconfiguration in a manner described below.

As mentioned above, one aspect of the present invention is directed to providing a system resource (e.g., host computer 1) that accesses system components with information identifying each system component in a manner that is independent of the physical configuration of the system. This can be done in any of numerous ways, and the present invention is not limited to any particular implementation. One example, illustrated in FIG. 4, of a format for providing such information is in the form of a routing table that can be stored in or provided to the system resource. For the purpose of illustration, the system resource will be described below in the context of a host computer 1, and the system components accessible thereby will be described as logical volumes in a system such as the storage system 3 of FIG. 1. However, it should be appreciated that the present invention can be employed in connection with any system resource that accesses other system components, and is not limited to use with a host computer. Similarly, it should be appreciated that the present invention is not limited to use with a disk drive storage system such as that shown in FIG. 1, and can be employed with any type of storage system (e.g., tape drive) that provides logical volumes to other system resources. Furthermore, the aspects of the present invention described below can be used in connection with numerous other types of system components that are capable of reconfiguration, including any devices accessible through a network such as the Fibre Channel cloud 100, and is not limited to use with logical volumes of a storage system.

Figure 3:
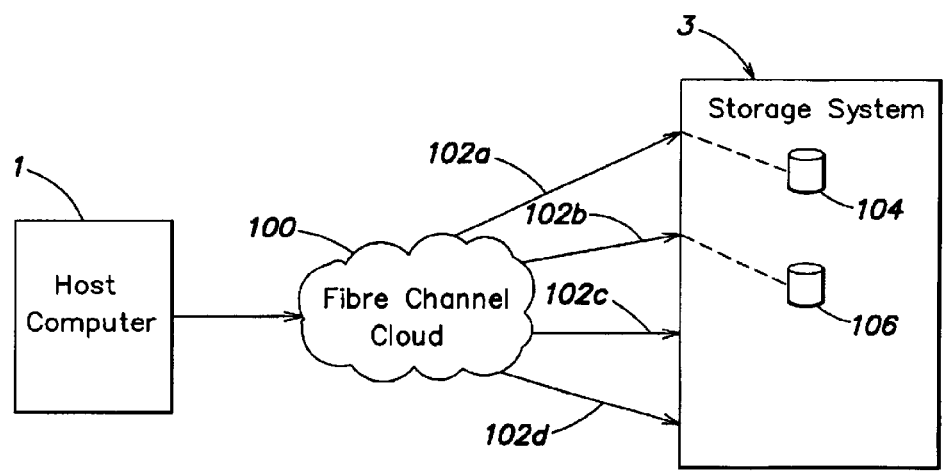
FIG. 3 is a block diagram of an exemplary computer system on which aspects of the present invention can be implemented.

The exemplary routing table 110 in FIG. 4 includes a row corresponding to each logical volume accessible by the host computer 1, and four columns 112, 114, 116 and 118 that provide three basic pieces of information concerning the logical volume. First, column 112 stores, for each logical volume, a unique identifier that does not depend upon a physical configuration of the computer system. This identifier can take any form, as the one shown in FIG. 4 is provided merely for illustrative purposes. For example, the logical volume identifier /dev/pp1 may uniquely identify logical volume 104 (FIG. 3), and will always uniquely identify logical volume 104, despite any changes that might be made to the configuration of the computer system. As discussed below, the logical identifier from column 112 will be the identifier employed by the file system/LVM layer 32 to identify the logical volume.

Second, the routing table 110 also may also include a column 118 storing an identifier that identifies the logical volume in the same manner as the operating system of the host computer 1, which will typically be in a manner that is dependent upon the physical configuration of the computer system and the path used by the host computer to access the logical volume. For example, the operating system of the host 1 may use the operating system device identifier /dev/dsk/c0t0d0 to identify a logical volume that is accessible to the host computer 1 at port number zero, and which has a target number of zero and a logical unit number (LUN) of zero. In the illustrative table of FIG. 4, the routing table 110 indicates that the configuration-independent logical volume identifier /dev/pp1 is currently identified by the operating system device identifier /dev/dsk/c0t0d0.

Finally, the routing table 110 may also contain additional information 115 that can be used to detect changes in the physical configuration of the computer system. In this respect, it should be appreciated that columns 112 and 118 in essence provide a mapping between the unique identifier that the file system/LVM layer 32 uses to identify a logical volume, and the name that the operating system will actually use to access the logical volume. If the system were reconfigured so that this mapping were to change, the routing table of FIG. 4 should be adjusted to reflect such a change. The information 115 can be used to facilitate detecting the change, and adjusting the identifier in column 118 to correct the mapping accordingly.

The information 115 can be provided in any of numerous forms, and the present invention is not limited to any particular implementation. The illustrative table of FIG. 4 corresponds to a computer system including a plurality of storage systems, wherein each storage system maintains a unique storage system identifier to identify it among the other storage systems, and further maintains a unique device identifier for each logical volume included therein. Using these two identifiers, each logical volume in the computer system can be uniquely identified. Thus, in the illustrative embodiment of FIG. 4, the storage system identifier for each logical volume is stored in column 116, and the device identifier is stored in column 114. For example, the exemplary routing table 110 indicates that the logical volume having logical volume identifier /dev/pp1 is in a storage system identified as storage system "s1" and is provided with a device identifier within that storage system of "d3". As mentioned above, the information 115 can be provided in numerous other forms. For example, in a system having only a single storage system, the column 116 to uniquely identify the storage system would be unnecessary.

In one embodiment of the present invention, the information 115 is used to detect changes in the configuration of the computer system. As mentioned above, if the configuration of the computer system changes, the configuration-dependent identifier 118 of a logical volume may change, which could result in the improper access of data if the change is not detected and the mapping information is not corrected. The information 115 is descriptive of the corresponding logical volume in a way that can be compared with information obtainable from a source in the computer system other than the routing table 110. Thus, a difference between the information obtained from the external source and the information 115 contained within the routing table can be used to indicate a change in the configuration of the computer system.

For example, referring again to FIG. 4, the volume identifier /dev/pp1 corresponds to a logical volume that, at the time the table was last updated, was identified by storage system device identifier "d3" in storage system "s1", and was identified by the operating system using device identifier /dev/dsk/c0t0d0. In response to a condition (discussed below) that triggers a check of the system configuration, the information in the routing table 110 can be used to determine whether a change has occurred in the configuration of the computer system. For example, the logical volume having operating system device identifier /dev/dsk/c0t0d0 may be queried at the time the check is performed to determine its storage system identifier and storage system device identifier. If either the storage system device identifier or the storage system identifier that is returned is not the same as that stored in the routing table 110, this indicates that a change has occurred in the configuration of the computer system, so that the logical volume identified by the file system/LVM layer 32 by identifier /dev/pp1 is no longer the logical volume identified by the operating system as /dev/dsk/c0t0d0.

It should be appreciated that detecting a change in the configuration of the computer system that results in a change in the identifier used by the operating system to access a logical volume provides a significant advantage over conventional systems, wherein the failure to detect such a configuration change can result in an application program accessing the wrong data. In response to the detection of such a configuration change, in accordance with one embodiment of the invention, a checking routine can provide an indication to a system administrator who can then take appropriate action.

The procedures described above for detecting changes to the configuration of a computer system are merely exemplary, as other techniques can be employed, such that the present invention is not limited to the particular detection techniques discussed above. For example, rather than including the additional information 115 in the routing table 110, information descriptive of the logical volume can be stored in the logical volume itself. For example, the volume identifier /dev/pp1 can be stored at a location within the logical volume identified by the operating system device identifier /dev/dsk/c0t0d0 when the system is initially configured. Thereafter, at a later point in time wherein it is desired to check the configuration of the computer system, the logical volume identified by the operating system device identifier /dev/dsk/c0t0d0 can be queried to return the logical volume identifier stored in that logical volume when the configuration of the system was last verified. If that logical volume identifier is not /dev/pp1, it indicates that the configuration of the computer system has been altered, and that the routing table 110 should be modified to correct the mapping for the new system configuration.

Figure 7:
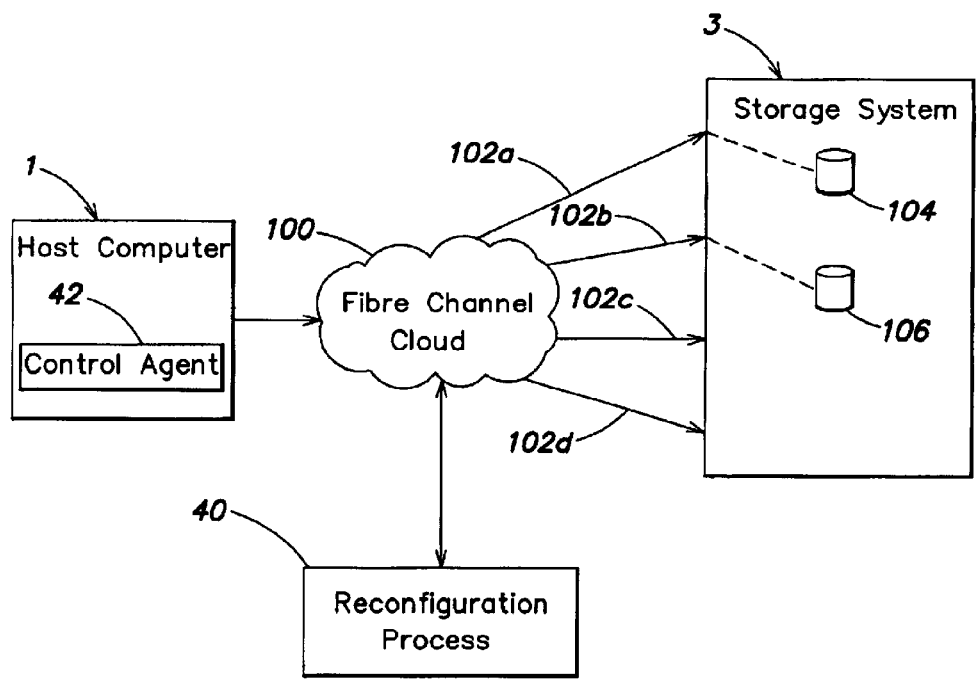
FIG. 7 is a block diagram of an exemplary computer system on which aspects of the present invention can be implemented.

In one embodiment of the present invention, the condition that triggers a check of the system configuration is a rebooting of the host computer 1. For example, it may be desirable to check the system configuration at the time of rebooting to detect any changes in the system configuration that have occurred subsequent to the last time the host computer 1 was initialized. In another embodiment of the present invention, a check of the system configuration is triggered each time the computer system is reconfigured. As described below, such a system configuration check may, for example, be triggered by a reconfiguration process 40 (FIG. 7). In one embodiment of the present invention in which components of the computer system are in communication with each other using a Fibre Channel cloud 100 (FIG. 3), the indication that the configuration of the computer system should be checked may be provided using a Fibre Channel feature called Registered State Change Notification (RSCN). RSCN provides a status frame indicating that the configuration of a Fibre Channel system has changed. It should be appreciated that a check of the system configuration may be triggered by other conditions, and that the conditions described above are purely exemplary, such that the present invention is not limited to the particular triggering conditions described above.

In another embodiment of the invention, the detection of a configuration change that changes the identifier used by the operating system to access a logical volume triggers a remapping process that automatically (i.e., without requiring system administrator involvement) and dynamically compensates for the reconfiguration of the system in a manner that is transparent to the applications running on the host computer 1, and without requiring a re-initialization of the file system/LVM layer 32 or any other mapping layer on the computer system. In this respect, it should be appreciated that the routing table of FIG. 4 in essence forms an additional layer of mapping 38 (FIG. 5) in the host computer, from the identifiers employed by the file system/LVM layer 32 to the identifiers employed by the operating system in actually accessing the logical volumes. The logical volume mapping layer 38 may, for example, allow the file system/ LVM layer 32 to refer to logical volumes using unique and fixed logical volume identifiers (e.g., such as those in column 112 of FIG. 4) that are independent of the configuration of the computer system. When the file system/LVM layer 32 makes a request to access a logical volume having a specified logical volume identifier, the logical volume mapping layer 38 may intercept the request, map the configuration-independent logical volume identifier to a configuration-dependent logical volume identifier (e.g., such as those in column 118 of FIG. 4), and pass the request, including the configuration-dependent logical volume identifier, to the multi-path mapping layer 34. In this way, the file system/LVM layer 32 may properly access a logical volume without being aware of any relationship between the logical volume and the physical configuration of the computer system.

By providing the additional layer of mapping 38, the identifiers employed by the file system/LVM layer 32 can remain constant to uniquely identify each logical volume. To account for possible reconfigurations of the computer system, this additional mapping layer 38 created by the routing table 110 is updatable. In addition, in the embodiment of the invention wherein reconfigurations can be handled in a manner that is transparent to the application programs executing on the host computer, the mapping layer 38 is dynamic, so that the mapping layer 38 can be updated without reinitializing the host computer or any entity therein that controls the dynamic mapping layer 38.

It should be appreciated that information in the routing table 110 (FIG. 4) that defines the dynamic mapping layer 38 can be updated in any of numerous ways in response to different types of system reconfigurations. For example, as discussed above, the computer system may be reconfigured in ways that cause the configuration-dependent information in the table 110 (e.g., the operating system identifiers in column 118) to become invalid. According to one embodiment of the present invention, in response to such a reconfiguration, the mapping information in the table is modified so that the logical volume identifiers accessible to the file system/LVM layer 32 (i.e., those in column 112 in table 110) continue to identify the same logical volumes.

For example, referring to FIG. 4, the configuration-independent logical volume identifier /dev/pp1 corresponds to a logical volume having a configuration-dependent operating system device identifier /dev/dsk/c0t0d0. This logical volume can correspond to the logical volume 104 (FIG. 3) discussed above. As further discussed above, as a result of a change to the configuration of the computer system, the operating system device identifier for logical volume 104 may change to /dev/dsk/c0t1d0. As a result, the entry in the routing table for the logical volume 104 (i.e., identified by the logical volume identifier /dev/pp1) will no longer be valid. In accordance with one embodiment of the present invention, when such a change in the configuration of the system is detected, the operating system device identifier field 118 of the routing table entry for the logical volume having logical volume identifier /dev/pp1 (i.e., logical volume 104) may be updated to contain the value /dev/dsk/ c0t1d0. As a result, when a component of the computer system (e.g., the file system/LVM layer 32) attempts to access the logical volume 104 by using logical volume identifier /dev/pp1, the dynamic mapping layer 38 will map that access request to operating system device identifier /dev/dsk/c0t1d0, thereby resulting in access being provided to the correct logical volume.

It should be appreciated that there are numerous types of changes that can occur to the configuration of the computer system. These changes can be broadly classified as either physical or logical changes. As used herein, the term physical changes refers to the modification (addition, deletion, or alteration) of a physical component of the system, such as the failure and removal of a port as discussed above. The term logical changes refers to changes other than physical changes that can impact the operating system device identifier used to access a logical volume. These changes can involve a reconfiguration within a single storage system or across two or more storage systems. For example, a single storage system may be logically reconfigured to change the port over which a logical volume is made accessible to the host computer 1. This may be done, for example, for load balancing reasons in a multi-path system. Similarly, a logical volume can be moved from one storage system to another. For any of these or numerous other types of physical or logical changes to the configuration of the computer system, the above-discussed aspects of the present invention can be employed to detect any changes that impact the operating system device identifier used to access any of the logical volumes in the system, and to modify the table 110 to ensure that the logical volume identifier (column 112 in FIG. 4) used by the file system/LVM layer 32 maps to the correct logical volume of data.

In addition to modifying the operating system identifier field 118 to maintain the proper mapping in the manner described above, it should further be appreciated that the fields 115 may also be updated when appropriate to reflect changes in the configuration of the computer system. For example, in one embodiment of the present invention, when a logical volume in a first storage system is moved to a second storage system, the table 110 may be updated to reflect the change. For example, referring to FIG. 4, if the logical volume having logical volume identifier /dev/pp1 were moved from the storage system having storage system identifier "s1" to a storage system having storage system identifier "s2", the storage system identifier field 116 of the routing table entry for logical volume /dev/pp1 may be updated to store the value "s2", and the storage system device identifier field 114 may be updated to store a new value for the logical volume in the storage system "s2". Similarly, when a logical volume is moved within a storage system so that its storage system identifier changes, the storage system identifier field 114 of the routing table may be updated to reflect the change. It should be appreciated that these changes to the mapping information are provided merely for illustrative purposes, and that numerous other types of changes are possible.

It should be appreciated that the routing table 110 (FIG. 4) is merely one manner of implementing the dynamic mapping layer 38 (FIG. 5), and that the present invention is not limited to this or any other particular implementation. All that is desired is that there be some technique employed for mapping between a first label that identifies a logical volume in a consistent manner that is independent of a configuration of the computer system and the label used by the operating system to identify the logical volume in a manner that is dependent upon the configuration of the computer system.

The routing table 110 and/or the dynamic mapping layer 38 may be stored in any of numerous locations in the computer system. For example, this mapping information can be stored in a local memory within the host computer 1 (FIG. 1) or can be stored on the storage system 3 at a location accessible to the host computer 1. In a computer system including multiple host computers, each host computer may include its own separate routing table 110 and/or mapping layer 38, or a lesser number of routing tables may be distributed throughout the computer system and shared by two or more host computers. For example, in a networked computing environment, such as that depicted in FIG. 7, there may be a single file system/LVM layer 32 that is shared by two or more host computers, in which case there may be a single routing table 110 and/or mapping layer 38 corresponding to the single file system/LVM layer 32. It should be appreciated that there may be any number of routing tables and/or dynamic mapping layers arranged in any suitable configuration.

Figure 5:
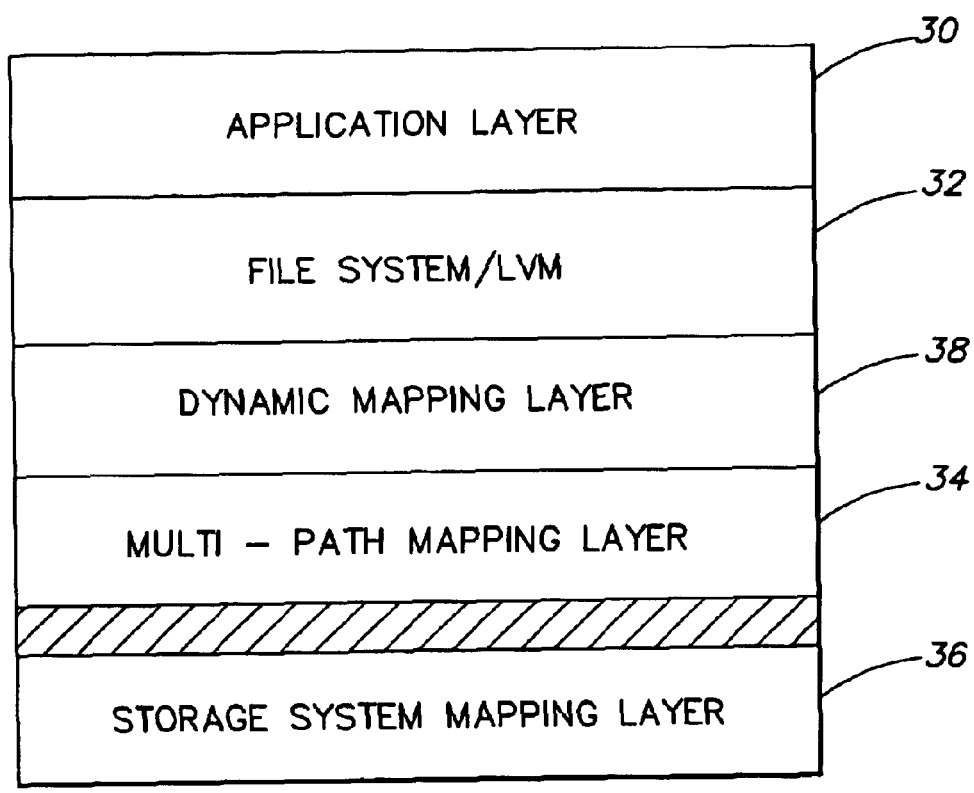
FIG. 5 is a schematic representation of a number of mapping layers including an additional dynamic mapping layer according to one embodiment of the present invention.

It should be appreciated that the placement of the dynamic mapping layer 38 between the file system/LVM layer 32 and the multi-path mapping layer 34 in FIG. 5 is purely exemplary, and that the present invention is not limited to such an implementation. The dynamic mapping layer 38 may be located anywhere between the application layer 30 and the storage system mapping layer 36.

The aspect of the present invention relating to the ability to detect changes in the configuration of a computer system that impact the operating system device identifiers used to access one or more logical volumes can be used in numerous applications. For example, one application for this aspect of the present invention is to detect physical changes to the configuration of the computer system when the host computer reboots. Thus, in the event that a physical change to the configuration of the system has taken place (e.g., the loss of a port on the storage system 3 as described above) subsequent to the last time the host computer was initialized, the aspects of the present invention discussed above can be used to detect any changes impacting the operating system identifier used for any of the logical volumes accessible to the host computer. In this respect, in accordance with one embodiment of the present invention, a verification routine is executed each time the host computer is initialized. The verification routine proceeds, in the manner described above, to query the logical volumes accessible to the host computer to compare the current information returned for each operating system identifier in column 118 of table 110 against the corresponding information 115 in the table 110 to detect any changes. When a change is detected, notification can be provided to a system administrator, or the table 110 can be dynamically and automatically (i.e., without intervention by a system administrator) modified to compensate for the change in the manner discussed above.

Another application for the above-discussed aspects of the present invention relates to a dynamic reconfiguration of the computer system, without requiring rebooting or reinitialization of the computer system. Such dynamic reconfiguration may be initiated and controlled by a reconfiguration process 40 (FIG. 7) that may be executed on the host computer 1 or some other component of the computer system. The reconfiguration process 40 may reconfigure the system in any of numerous ways, as the present invention is not limited to achieving any specific manner of reconfiguration.

One example of a reconfiguration process relates to a computer system in which at least one host computer 1 communicates with the storage system 3 through its multiple ports 18*a–d* (FIG. 1). In such a system, it may be desirable under certain circumstances to reconfigure the system to change one or more of the ports of the storage system 3 that are used to access one or more logical volumes. Such a reconfiguration may be desirable for load balancing reasons, for example, when the amount of data being accessed through one of the ports 18*a–d* of the storage system 3 exceeds the bandwidth of that port. In such a case, it may be desirable to shift some of the traffic through the port to another port. The reconfiguration process 40 may, for example, monitor the load on each of the ports 18*a–d* of the storage system 3. When the reconfiguration process 40 determines that one of the ports 18*a–d* is overloaded, it may trigger reassignment of one or more of the logical volumes accessible through the overloaded port to a less heavily-loaded port.

Another exemplary reconfiguration process relates to a computer system including multiple storage systems 3. If one of the storage systems 3 is heavily used, its storage capacity may be exceeded. In such a case, it may be desirable to relocate one or more of the logical volumes stored on the over-loaded storage system to another storage system.

It should be appreciated that the above-provided examples of reconfiguration processes 40 that may reconfigure the computer system are provided merely for illustrative purposes, and that the present invention is not limited to use with these or any other specific reconfiguration processes. Rather, the aspects of the present invention discussed herein can be used to perform numerous types of dynamic system configuration for numerous reasons, and the present invention is not limited to any particular reconfiguration process.

In one embodiment of the present invention, the reconfiguration process 40 triggers reconfiguration of the computer system by instructing a process referred to as a control agent 42 (FIG. 7) to control the dynamic reconfiguration of the computer system. The control agent 42 controls the reconfiguration process, as described below. In the exemplary implementation shown in FIG. 7, the control agent 42 is implemented in the host computer 1. However, it should be appreciated that the control agent 42 alternatively may be implemented on any system component accessible through the Fibre Channel cloud 100. Furthermore, the control agent 42 may be implemented in any form, such as in hardware, software, firmware, or a combination thereof.

Figure 6A:
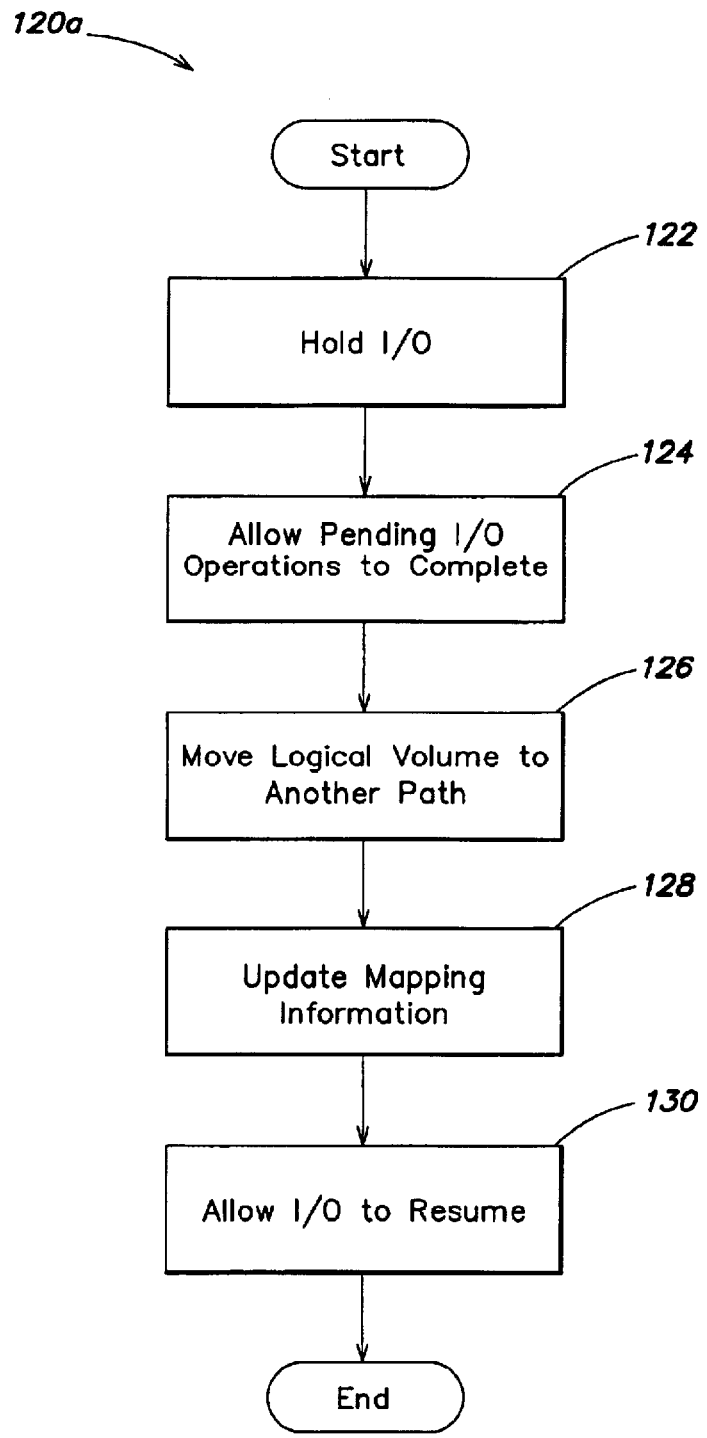
FIGS. 6A–C are flow charts of methods for reconfiguring a computer system according to one embodiment of the present invention.
Figure 6B:
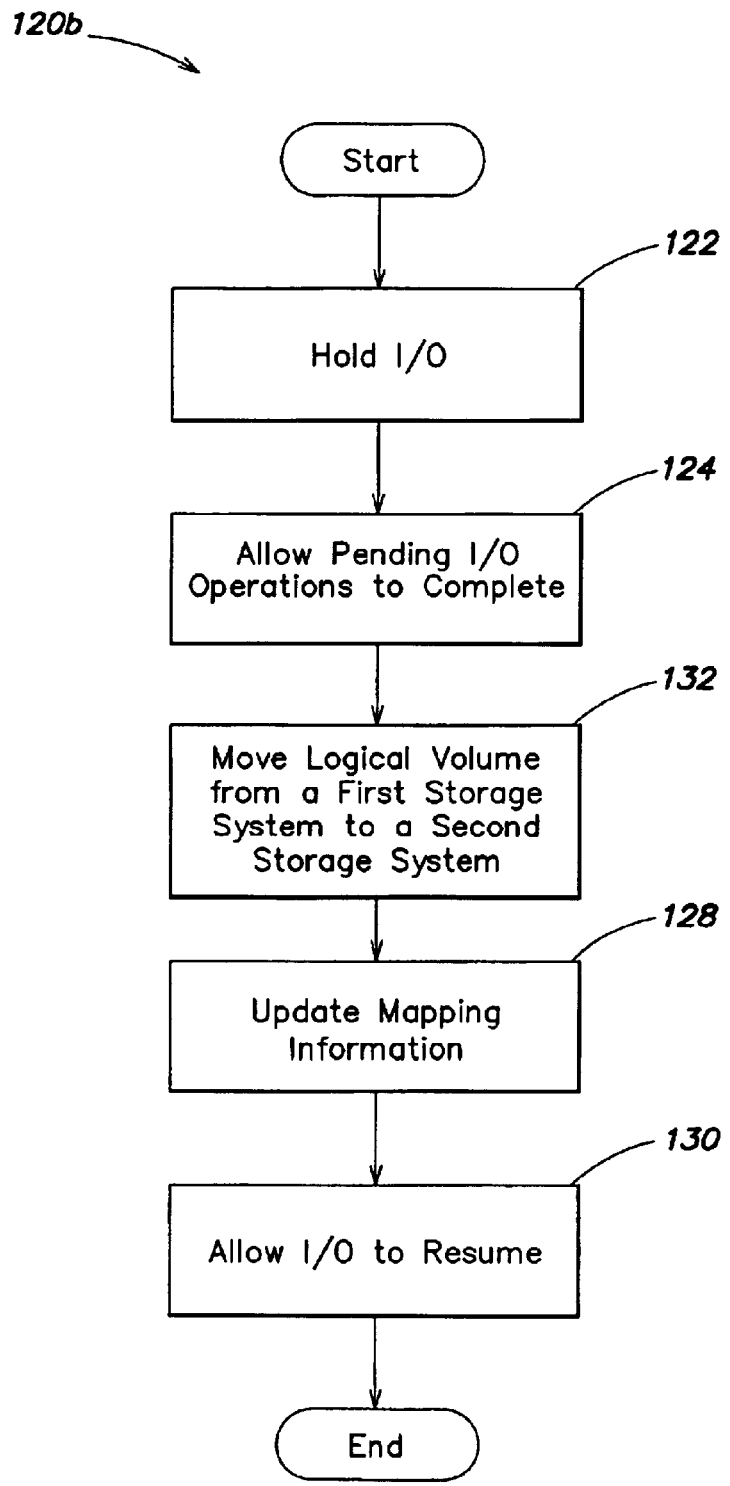
Figure 6C:
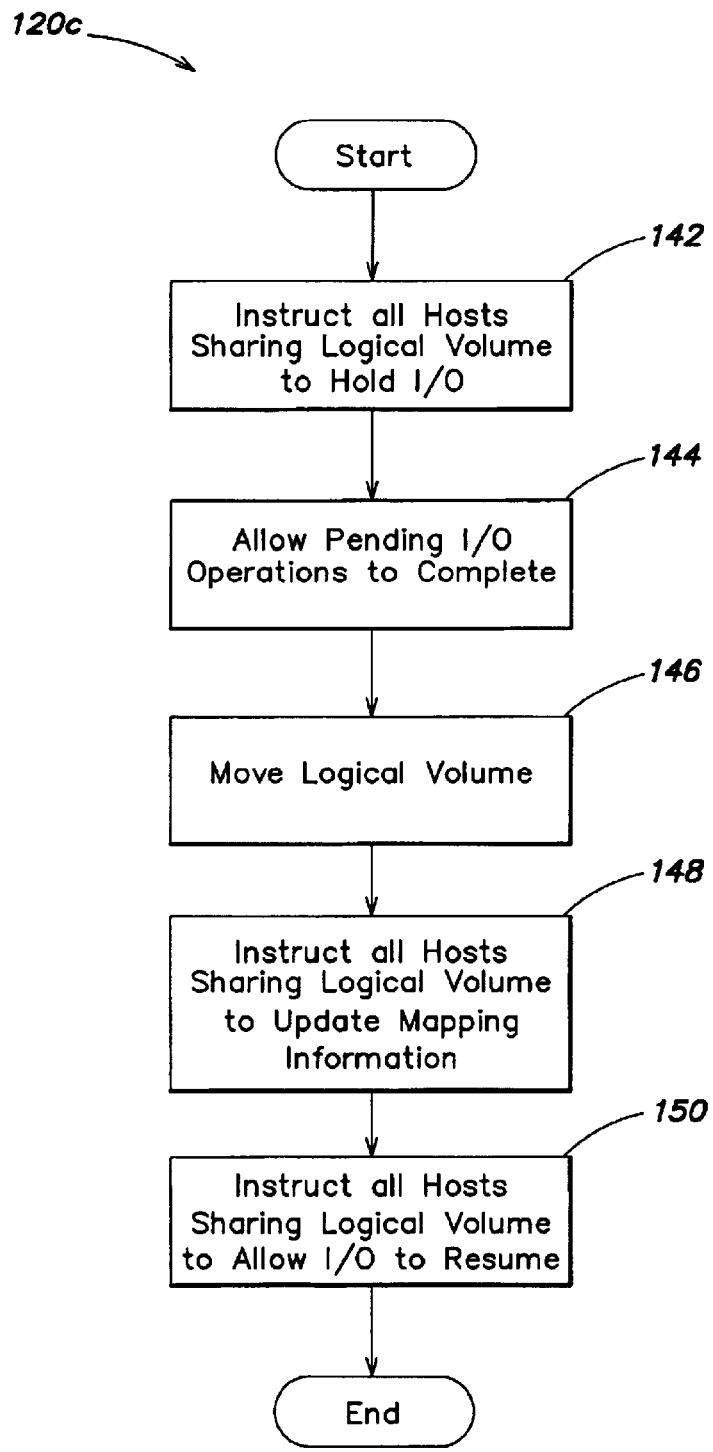

FIGS. 6A–C illustrate three exemplary routines 120*a*–*c* that may be executed by the control agent 42 to reconfigure the computer system in response to three different types of reconfiguration process 40. As described above, in one embodiment, reconfiguration of the configuration system may be performed dynamically, i.e., in a manner transparent to the application programs running on the host computer 1 and without requiring that the host computer 1 be re-initialized (i.e., rebooted). Such dynamic reconfiguration advantageously decreases any delay that might otherwise be associated with reconfiguring the computer system, and decreases the amount of human intervention required to perform reconfiguration.

For example, referring to FIG. 6A, the control agent 42 may execute a routine 120*a* to move a logical volume within the storage system 3 so that it is exported from the storage system over a different port. For example, the routine 120*a* may move the logical volume 104 from path 102*a* to path 102*b*. Moving a logical volume within the storage system 3 can be accomplished in any of numerous ways, and the present invention is not limited to any particular implementation technique. For example, where the storage system 3 is a storage system from the SYMMETRIX line of disk arrays, available from EMC Corporation, Hopkinton, Mass., the routine 120*a* may employ a facility called Dynamic Disk Relocation (DDR) to move a logical volume within the storage system 3 so that it is accessible via a different port. However, the present invention is not limited in this respect, as numerous other techniques can alternatively be employed.

The routine 120*a* can be initialized in response to an instruction from the reconfiguration process 40 to move the logical volume from the first path to the second path. Initially, the routine 120*a* holds incoming input/output (I/O) commands from the application layer 30 directed to the logical volume to be moved (step 122). For example, the routine 120*a* may instruct the dynamic mapping layer 38 to hold incoming I/O commands issued by the application layer 30 (through the file system/LVM layer 32), rather than forwarding them to the multi-path mapping layer 34 and on to the storage system 3. Next, the routine 120*a* allows pending I/O operations between the application layer 30 and the storage system 3 to be completed (step 124). For example, referring again to FIG. 8, if the application layer 30 has issued an I/O command to the storage system 3 which has not yet completed, the I/O command is allowed to complete.

Next, the routine 120*a* moves the logical volume from the first path to the second path (step 126). As mentioned above, this move can be accomplished using DDR when the storage system 3 is from the SYMMETRIX line of disk arrays, or can be accomplished in numerous other ways. If, as a result of the movement of the logical volume from the first path to the second path, the host computer 1 is no longer in communication with any logical volumes accessible through the port associated with the first path, the routine 120*a* may log out the host computer 1 from the port associated with the first path. Similarly, if the host computer 1 was not previously logged in to the port associated with the second path, the routine 120*a* may log in the host computer 1 to the port associated with the second path, thus allowing the host computer 1 to communicate with the moved logical volume through its new port. In one embodiment of the present invention for use in a Fibre Channel system, logging in and out of ports of the storage system may be accomplished in the following manner. In computer systems implementing the Fibre Channel standard, such as the computer system shown in FIG. 7, each port of each device accessible via the Fibre Channel cloud 100 is assigned a unique and fixed identifier referred to as a world wide name (WWN). Each world wide name, in turn, has a corresponding temporary identifier (ID). A Fibre Channel Name Server accessible via the Fibre Channel cloud 100 maintains a directory that maps world wide names to their corresponding IDs. To communicate with a port, a device obtains the port's ID from the Name Server and uses the ID to perform a "port login" to establish a logical connection with the port. The device may then communicate with the port over the logical connection. Similarly, a device may use a port's ID to log out from the port.

Once the routine 120*a* has moved the logical volume to the second path in step 126, the routine 120*a* updates the dynamic mapping layer 38 to reflect the new configuration of the computer system, i.e., to reflect the fact that the logical volume is now accessible to the host computer 1 through a different path (step 128). For example, if the logical volume 104 was moved from path 102*a* to path 102*b*, the routine 120*a* may modify the operating system identifier field of the routing table entry (FIG. 4) corresponding to the logical volume 104 to store the new operating system identifier of the logical volume 104. As mentioned above, the mapping layer 38 can be updated dynamically, without reinitializing the host computer 1, the control agent 42, or the entity that owns the dynamic mapping layer 38. It should be appreciated that the mapping information may be updated in any of numerous ways to reflect the new mapping from the configuration-independent logical volume identifiers to the logical volume identifiers that depend upon the new configuration of the computer system.

Once the dynamic mapping layer 38 is updated, the routine 120*a* allows I/O operations between the application layer 30 and the moved logical volume (e.g., logical volume 104) to resume (step 130). For example, the routine 120*a* may forward the I/O commands that it held in step 122 to the multi-path mapping layer 34 and on to the storage system 3, thus resuming a normal flow of I/O between the application layer 30 and the moved logical volume. Reconfiguration of the computer system is then complete. Because reconfiguration of the computer system is dynamic, the application program accessing the moved logical volume need not be re-initialized. Rather, 110 between the application layer 30 and the storage system 3 is interrupted only briefly, and in a way that is transparent to the application layer 30.

Referring to FIG. 6B, another exemplary form of reconfiguration that may be performed by the control agent 42 is that of moving a logical volume from a first storage system to a second storage system. The control agent 42 may execute a routine 120*b* to move the logical volume from the first storage system to the second storage system. As with the routine 120*a* of FIG. 6A, the routine 120*b* is initiated in response to an instruction from the reconfiguration process 40 to perform the move, and initially performs steps of holding I/O commands from the application layer 30 the logical volume to be moved (step 122) and allowing the pending I/O operations to be completed (step 124), as described above. The routine 120*b* then moves the logical volume from the first storage system to the second storage system (step 136). If, as a result of the movement of the logical volume from the first storage system to the second storage system, the host computer 1 is no longer in communication with any logical volumes accessible through the port through which the moved logical volume was accessible on the first storage system, the routine 120b may log out the host computer 1 from the port through which the moved logical volume was accessible on the first storage system. Similarly, if the host computer 1 was not previously logged in to the port through which the moved logical volume is accessible on the second storage system, the routine 120b may log in the host computer 1 to the port through which the moved logical volume is accessible on the second storage system, thus allowing the host computer 1 to communicate with the moved logical volume through its new port.

Moving a logical volume from a first storage system to a second storage system can be accomplished in any of numerous ways, and the present invention is not limited to any particular implementation technique. For example, the copying of a logical volume from the first storage system to the second storage system can be controlled by a host computer coupled to both storage systems, where the host computer can read the data from the first storage system and write it to the second. Alternatively, where the storage systems are intelligent storage systems and have a direct communication link between them, the direct link can be used to perform the copy, thereby leaving the host computer free to perform other actions. For example, where both of the storage systems are from the SYMMETRIX line of disk arrays, available from EMC Corporation, Hopkinton, Mass., a feature called SYMMETRIX Remote Data Facility (SRDF) can be employed to copy the logical volume from the first storage system to the second storage system. After the logical volume is moved, the routine 120b then updates the mapping information to reflect the new configuration of the computer system (step 128) and allows I/O between the application layer 30 and the moved logical volume to resume (step 130) in the same manner as described above in connection with steps 128 and 130 in FIG. 6A.

An additional level of complexity is encountered when the control agent 42 seeks to reconfigure the system in a way that impacts a logical volume that is shared by (i.e., is accessible to) two or more host computers. In particular, in addition to halting I/O operations directed to the logical volume from a host computer associated with the control agent 42, I/O operations to the logical volume should be halted from all other host computers, so that the logical volume is not written while it is in the process of being moved. This can be accomplished in numerous ways, and the present invention is not limited to any particular implementation.

FIG. 6C illustrates another embodiment of the present invention wherein the control agent 42 executes a routine 120c to move a logical volume that is shared by two or more host computers. As with the routines 120a–b of FIGS. 6A–B the routine 120c is initiated in response to instruction from the reconfiguration process 40 to perform the move.

In step 142, the routine 120c sends a message, over the Fibre Channel cloud 100, to all hosts sharing the logical volume to be moved, instructing the hosts to hold incoming I/O commands between the hosts' application layers and the logical volume to be moved (step 142). When the control agent 42 is implemented on one of the hosts, the control agent 42 may obtain the addresses of the other hosts by, for example, requesting from the storage system 3 the addresses of all other hosts that share the logical volume to be moved. After sending such messages to the hosts, the routine 120c may wait for acknowledgment from the hosts that the request to halt I/O has been followed before the routine 120c proceeds to the next step. The routine 120c then queries all hosts to determine when their pending I/O commands to the target volume have completed (step 144). In step 146, the routine 120c then moves the logical volume. This can be done in any of numerous ways, as described above with respect to steps 126 (FIG. 6A) and 132 (FIG. 6B). The routine 120c may then send messages to all hosts sharing the moved logical volume instructing them to log out, if necessary, from the port from which the logical volume was moved, and to log in, if necessary, to the port to which the logical volume was moved. The routine 120c instructs each of the hosts that shares the logical volume to update its mapping information to reflect the new configuration of the computer system (step 148), and to allow I/O between the hosts' application layers and the moved logical volume to resume (step 150).

The procedure described above with respect to FIG. 6C is merely an exemplary procedure for moving a logical volume shared by multiple hosts. It should be appreciated, however, that such a procedure can be implemented in any of numerous ways, and that the present invention is not limited to any particular implementation technique. For example, the control agent 42 may reside on any of the hosts sharing the logical volume to be moved, or may be located on any other component of the computer system. Furthermore, as described above, use of the control agent 42 to perform the reconfiguration process is itself merely exemplary, and is not a limitation of the present invention.

The illustrative embodiments of the present invention discussed above have been described in connection with an illustrative system such as that shown in FIG. 1, wherein the computer system includes a host computer 1 and a computer system resource that is a storage system 3. However, it should be appreciated that the present invention is not limited in this respect, and that the aspects of the present invention described above can be used in connection with computer systems having numerous other configurations. Thus, the dynamic mapping information described above may be used in conjunction with any kind of device, such that the use of the storage system 3 and the logical volumes accessible therein is purely exemplary and is not a limitation of the present invention. In addition, as described above, Fibre Channel has provided an environment wherein system configuration changes have become more prevalent, such that the embodiments of the present invention discussed above can be advantageous when used in connection with a Fibre Channel system. However, it should be appreciated that the present invention is not limited in this respect, and can be used in connection with numerous other system configurations that do not employ the Fibre Channel protocol.

As discussed above, the embodiments of the present invention described herein can be implemented in numerous ways, and the present invention is not limited to any particular manner of implementation. For example, the aspects of the present invention relating to the dynamic reconfiguration of a computer system, as well as those relating to detecting changes to the configuration of a computer system, can be performed in numerous ways within the computer system. In a system such as that shown in FIG. 1, the detecting and reconfiguring functions can be implemented, for example, within the disk controllers 7a–7b, the storage bus directors 9, and/or the host bus adapters 5a–d. The detecting and reconfiguring functions can be implemented, for example, as one or more drivers within the host bus adapters 15a–d of the host computer 1. In a system such as that shown in FIG. 3, the detecting and reconfiguring functions can be implemented, for example, within the host computer 1, the storage system 3, and/or the reconfiguration process 40. In this respect, it should be appreciated that all of these system components and their sub-components can be generically considered as controllers, such that the computer system can be provided with at least one controller to perform the detecting and reconfiguring functions. These functions can be performed by a single controller, or can be distributed amongst multiple controllers in the manner described above.

As further discussed above, the controllers that perform the aspects of the present invention can be implemented in numerous ways, such as with dedicated hardware, or using a processor that is programmed using microcode or software to perform the functions recited above. In this respect, it should be appreciated that one implementation of the present invention comprises a computer readable medium (e.g., a computer memory, a floppy disk, a compact disc, a tape, etc.) encoded with a computer program that, when executed on a processor, performs the above-discussed functions of the present invention. The computer readable medium can be transportable, such that the program stored thereon can be loaded onto a storage system, host computer or other computer system component to implement the aspects of the present invention discussed above. In addition, it should be appreciated that the reference to a computer program that, when executed, performs the above-discussed functions is not limited to an application program running in application space on the host computer. Rather, the term computer program is used herein in a generic sense to reference any type of computer code (e.g., software or microcode) that can be employed to program a processor to implement the above-discussed aspects of the present invention.

Having described several embodiments of the invention in detail, various modifications and improvement will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. In a computer system including a host computer and at least one computer system resource accessible to the host computer, wherein the host computer comprises an operating system and the operating system uses at least one identifier to enable access by the host computer to the at least one computer system resource, the at least one identifier identifying the at least one computer system resource, a method of responding to changes in a configuration of the computer system impacting a manner in which the at least one computer system resource is accessed by the host computer, the method comprising steps of:

(A) storing information relating to a first configuration of the computer system at a first point in time, the first configuration relating to a first manner of accessing the at least one computer system resource by the host computer, the first manner of accessing the at least one computer system resource including the use of a first identifier by the operating system to identify the at least one computer system resource;

(B) determining a second configuration of the computer system at a second point in time, the second configuration relating to a second manner of accessing the at least one computer system resource by the host computer;

(C) comparing the second configuration of the computer system with the first configuration to determine whether the second configuration differs from the first configuration in that the second manner of accessing the at least one computer system resource includes the use of a second identifier by the operating system to identify the at least one computer system resource, wherein the second identifier differs from the first identifier; and (D) when it is determined in the step (C) that the second configuration differs from the first configuration, determining the second identifier used by the operating system in the second manner of accessing the at least one computer system resource by the host computer, wherein the act of determining comprises using at least one component of information that uniquely identifies the at least one computer system resource in a manner that is independent of the second configuration.

2. The method of claim 1, wherein the step (B) includes a step of determining the second configuration of the computer system in response to a rebooting of the host computer.

3. The method of claim 1, wherein the step (B) includes a step of determining the second configuration of the computer system each time the host computer is rebooted.

4. The method of claim 1, wherein the at least one computer system resource includes a plurality of devices accessible by the host computer, and wherein the step (A) includes a step of storing the information relating to the first configuration in a form that includes at least one component of information that uniquely identifies each one of the plurality of devices accessible by the host computer using information independent of the first configuration of the computer system.

5. The method of claim 4, wherein the at least one computer system resource includes at least one storage system and the plurality of devices includes a plurality of logical volumes of data in the at least one storage system, and wherein the step (A) includes a step of storing, for each one of the logical volumes, an identifier that uniquely identifies the logical volume among the plurality of logical volumes in the at least one storage system.

6. The method of claim 5, wherein the at least one storage system includes a plurality of storage systems, and wherein the step (A) includes a step of storing, for each one of the plurality of logical volumes, an identifier that uniquely identifies a one of the plurality of storage systems in which the one of the plurality of logical volumes is stored.

7. The method of claim 1, wherein the at least one computer system resource includes a plurality of devices accessible by the host computer, and wherein the step (A) includes a step of storing the information relating to the first configuration in a form that includes first and second identifiers for each one of the plurality of devices accessible by the host computer, the first identifier identifying the one of the plurality of devices using information relating to the first configuration of the computer system, the second identifier identifying the one of the plurality of devices using information independent of the first configuration of the computer system.

8. The method of claim 7, wherein the at least one computer system resource includes at least one storage system and the plurality of devices includes a plurality of logical volumes of data, and wherein the step (A) includes a step of storing the first and second identifiers for each of the plurality of logical volumes, and wherein the second identifier for each one of the logical volumes uniquely identifies the logical volume among the plurality of logical volumes in the at least one storage system.

9. The method of claim 7, wherein the first identifier includes information descriptive of a path through which the one of the plurality of logical volumes is accessible to the host computer.

10. The method of claim 7, wherein the step (A) includes a step of storing the information relating to the first configuration in a form that further includes a third identifier for each one of the plurality of devices accessible by the host computer, the third identifier being formed from a piece of information that is obtainable by accessing the one of the plurality of devices at the first point in time.

11. The method of claim 10, wherein the step (B) includes a step of, for at least one of the first identifiers, querying the at least one of the plurality of devices corresponding to the at least one of the first identifiers at the second point in time to obtain the piece of information available by accessing the at least one of the plurality of devices, and wherein the step (C) includes a step of comparing the piece of information obtained in the step (B) to the third identifier stored in the step (A) to determine whether the second configuration differs from the first configuration with respect to the at least one of the plurality of devices.

12. The method of claim 1, wherein the at least one computer system resource includes a plurality of devices accessible by the host computer, and wherein the step (A) includes a step of storing the information relating to the first configuration in a form that includes an identifier for each one of the plurality of devices accessible by the host computer, the identifier being formed from a piece of information that is obtainable by accessing the one of the plurality of devices at the first point in time.

13. The method of claim 12, wherein the step (B) includes a step of querying at least one of the plurality of devices at the second point in time to obtain the piece of information available by accessing the at least one of the plurality of devices, and wherein the step (C) includes a step of comparing the piece of information obtained in the step (B) to the identifier stored in the step (A) to determine whether the second configuration differs from the first configuration with respect to the at least one of the plurality of devices.

14. A computer readable medium encoded with a program for execution on a host computer in a computer system including the host computer and at least one computer system resource accessible to the host computer, wherein the host computer comprises an operating system and the operating system uses at least one identifier to enable access by the host computer to the at least one computer system resource, the at least one identifier identifying the at least one computer system resource, the program, when executed on the host computer, performs a method of responding to changes in a configuration of the computer system impacting a manner in which the at least one computer system resource is accessed by the host computer, the method comprising steps of:

(A) storing information relating to a first configuration of the computer system at a first point in time, the first configuration relating to a first manner of accessing the at least one computer system resource by the host computer, the first manner of accessing the at least one computer system resource including the use of a first identifier by the operating system to identify the at least one computer system resource;

(B) determining a second configuration of the computer system at a second point in time, the second configuration relating to a second manner of accessing the at least one computer system resource by the host computer;

(C) comparing the second configuration of the computer system with the first configuration to determine whether the second configuration differs from the first configuration in that the second manner of accessing the at least one computer system resource includes the use of a second identifier by the operating system to identify the at least one computer system resource, wherein the second identifier differs from the first identifier; and (D) when it is determined in the step (C) that the second configuration differs from the first configuration, determining the second identifier used by the operating system in the second manner of accessing the at least one computer system resource by the host computer, wherein the act of determining comprises using at least one component of information that uniquely identifies the at least one computer system resource in a manner that is independent of the second configuration.

15. The computer readable medium of claim 14, wherein the step (B) includes a step of determining the second configuration of the computer system in response to a rebooting of the host computer.

16. The computer readable medium of claim 14, wherein the step (B) includes a step of determining the second configuration of the computer system each time the host computer is rebooted.

17. The computer readable medium of claim 14, wherein the at least one computer system resource includes a plurality of devices accessible by the host computer, and wherein the step (A) includes a step of storing the information relating to the first configuration in a form that includes at least one component of information that uniquely identifies each one of the plurality of devices accessible by the host computer using information independent of the first configuration of the computer system.

18. The computer readable medium of claim 14, wherein the at least one computer system resource includes a plurality of devices accessible by the host computer, and wherein the step (A) includes a step of storing the information relating to the first configuration in a form that includes first and second identifiers for each one of the plurality of devices accessible by the host computer, the first identifier identifying the one of the plurality of devices using information relating to the first configuration of the computer system, the second identifier identifying the one of the plurality of devices using information independent of the first configuration of the computer system.

19. The computer readable medium of claim 18, wherein the at least one computer system resource includes at least one storage system and the plurality of devices includes a plurality of logical volumes of data, and wherein the step (A) includes a step of storing the first and second identifiers for each of the plurality of logical volumes, and wherein the second identifier for each one of the logical volumes uniquely identifies the logical volume among the plurality of logical volumes in the at least one storage system.

20. The computer readable medium of claim 18, wherein the first identifier includes information descriptive of a path through which the one of the plurality of logical volumes is accessible to the host computer.

21. The computer readable medium of claim 18, wherein the step (A) includes a step of storing the information relating to the first configuration in a form that further includes a third identifier for each one of the plurality of devices accessible by the host computer, the third identifier being formed from a piece of information that is obtainable by accessing the one of the plurality of devices at the first point in time.

22. The computer readable medium of claim 21, wherein the step (B) includes a step of, for at least one of the first identifiers, querying the at least one of the plurality of devices corresponding to the at least one of the first identifiers at the second point in time to obtain the piece of information available by accessing the at least one of the plurality of devices, and wherein the step (C) includes a step of comparing the piece of information obtained in the step (B) to the third identifier stored in the step (A) to determine whether the second configuration differs from the first configuration with respect to the at least one of the plurality of devices.

23. The computer readable medium of claim 14, wherein the at least one computer system resource includes a plurality of devices accessible by the host computer, and wherein the step (A) includes a step of storing the information relating to the first configuration in a form that includes an identifier for each one of the plurality of devices accessible by the host computer, the identifier being formed from a piece of information that is obtainable by accessing the one of the plurality of devices at the first point in time.

24. The computer readable medium of claim 23 wherein the step (B) includes a step of querying at least one of the plurality of devices at the second point in time to obtain the piece of information available by accessing the at least one of the plurality of devices, and wherein the step (C) includes a step of comparing the piece of information obtained in the step (B) to the identifier stored in the step (A) to determine whether the second configuration differs from the first configuration with respect to the at least one of the plurality of devices.

25. A host computer for use in a computer system including the host computer and at least one computer system resource accessible to the host computer, the host computer comprising:

an operating system for enabling access to the at least one computer system resource, the operating system using at least one identifier to enable access by the host computer to the at least one computer system resource, the at least one identifier identifying the at least one computer system resource;

storing means for storing information relating to a first configuration of the computer system at a first point in time, the first configuration relating to a first manner of accessing the at least one computer system resource by the host computer, the first manner of accessing the at least one computer system resource including the use of a first identifier by the operating system to identify the at least one computer system resource;

first determining means for determining a second configuration of the computer system at a second point in time, the second configuration relating to a second manner of accessing the at least one computer system resource by the host computer;

comparing means for comparing the second configuration of the computer system with the first configuration to determine whether the second configuration differs from the first configuration in that the second manner of accessing the at least one computer system resource includes the use of a second identifier by the operating system to identify the at least one computer system resource, wherein the second identifier differs from the first identifier; and second determining means for determining the second identifier used by the operating system in the second manner of accessing the at least one computer system resource by the host computer when it is determined by the first determining means that the second configuration differs from the first configuration, wherein the act of determining comprises using at least one component of information that uniquely identifies the at least one computer system resource in a manner that is independent of the second configuration.

26. The host computer of claim 25, wherein the first determining means includes means for determining the second configuration of the computer system in response to a rebooting of the host computer.

27. The host computer of claim 25, wherein the at least one computer system resource includes a plurality of devices accessible by the host computer, and wherein the storing means includes means for storing the information relating to the first configuration in a form that includes at least one component of information that uniquely identifies each one of the plurality of devices accessible by the host computer using information independent of the first configuration of the computer system.

28. The host computer of claim 25, wherein the at least one computer system resource includes a plurality of devices accessible by the host computer, and wherein the storing means includes means for storing the information relating to the first configuration in a form that includes first and second identifiers for each one of the plurality of devices accessible by the host computer, the first identifier identifying the one of the plurality of devices using information relating to the first configuration of the computer system, the second identifier identifying the one of the plurality of devices using information independent of the first configuration of the computer system.

29. The host computer of claim 28, wherein the at least one computer system resource includes at least one storage system and the plurality of devices includes a plurality of logical volumes of data, and wherein the storing means includes means for storing the first and second identifiers for each of the plurality of logical volumes, and wherein the second identifier for each one of the logical volumes uniquely identifies the logical volume among the plurality of logical volumes in the at least one storage system.

30. The host computer of claim 28 wherein the first identifier includes information descriptive of a path through which the one of the plurality of logical volumes is accessible to the host computer.

31. The host computer of claim 28, wherein the storing means includes means for storing the information relating to the first configuration in a form that further includes a third identifier for each one of the plurality of devices accessible by the host computer, the third identifier being formed from a piece of information that is obtainable by accessing the one of the plurality of devices at the first point in time.

32. The host computer of claim 31, wherein the first determining means includes means for querying the at least one of the plurality of devices corresponding to at least one of the first identifiers at the second point in time to obtain the piece of information available by accessing the at least one of the plurality of devices, and wherein the comparing means includes means for comparing the piece of information obtained by the first determining means to the third identifier stored by the storing means to determine whether the second configuration differs from the first configuration with respect to the at least one of the plurality of devices.

33. The host computer of claim 25, wherein the at least one computer system resource includes a plurality of devices accessible by the host computer, and wherein the storing means includes means for storing the information relating to the first configuration in a form that includes an identifier for each one of the plurality of devices accessible by the host computer, the identifier being formed from a piece of information that is obtainable by accessing the one of the plurality of devices at the first point in time.

34. The host computer of claim 33, wherein the first determining means includes means for querying at least one of the plurality of devices at the second point in time to obtain the piece of information available by accessing the at least one of the plurality of devices, and wherein comparing means includes means for comparing the piece of information obtained by the first determining means to the identifier stored by the storing means to determine whether the second configuration differs from the first configuration with respect to the at least one of the plurality of devices.

* * * * *